Feb. 8, 1949.  R. W. JENNY  2,461,422
HELICOPTER ENGINE SUSPENSION
Filed July 8, 1944
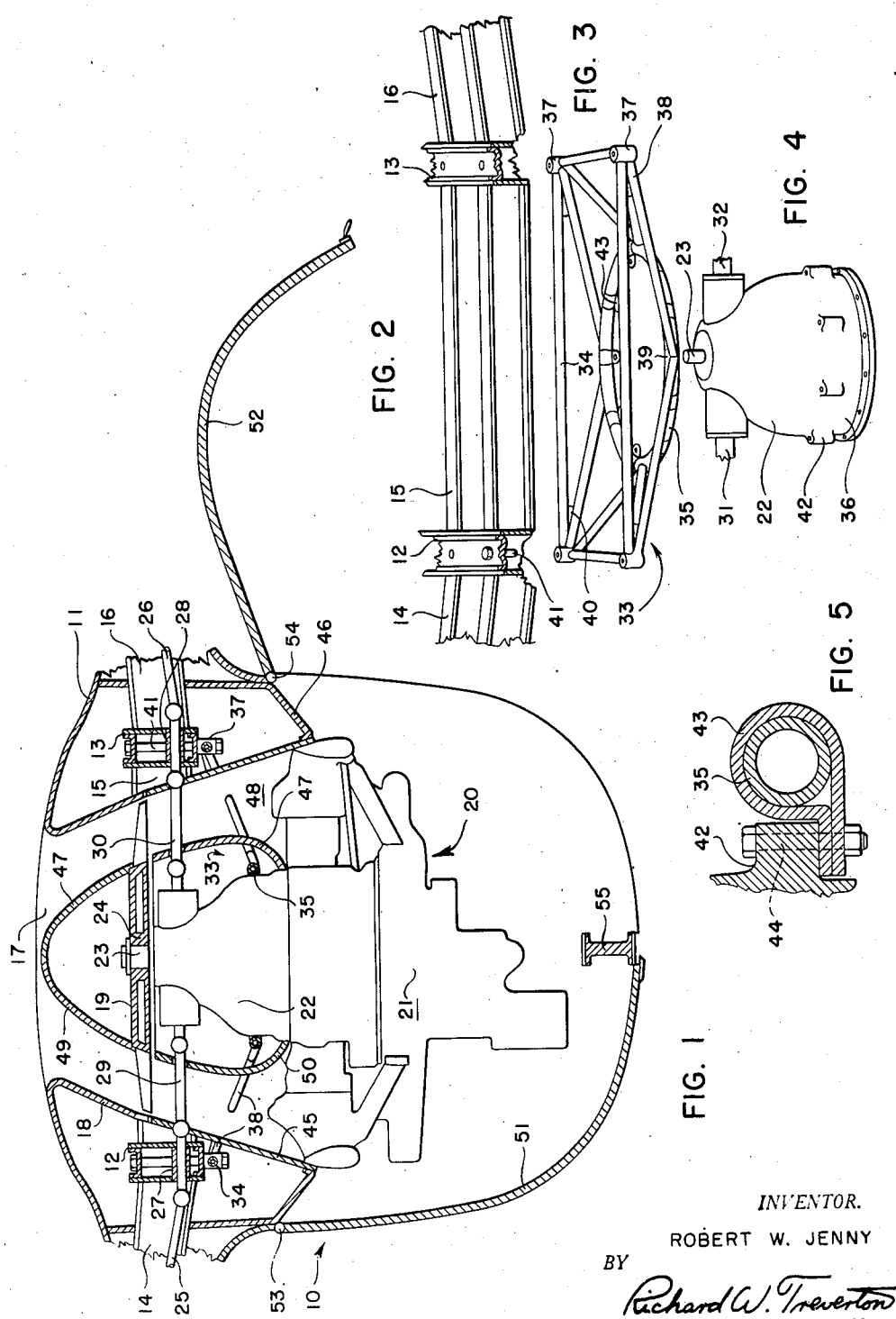
INVENTOR.
ROBERT W. JENNY
BY
Richard W. Treverton
ATTORNEY Patented Feb. 8, 1949

2,461,422

UNITED STATES PATENT OFFICE 2,461,422

HELICOPTER ENGINE SUSPENSION

Robert W. Jenny, East Paterson, N. J., assignor to Curtiss-Wright Corporation, a corporation of Delaware Application July 8, 1944, Serial No. 544,119

14 Claims. (Cl. 244—55)

1

The invention relates in general to a helicopter fuselage construction, particularly to the upper portion thereof, and the invention especially relates to a novel form of mounting for an engine suspended in the upper portion of a fuselage cowling.

The primary object of the invention is to simplify the mountings for helicopter engines and at the same time to provide a light, rugged reinforcement for the structural fuselage parts which support the engine.

Among the other objects of the invention is to provide an improved form of assembly of engine and helicopter fuselage which will provide for an easy demounting of the engine from the fuselage without any material modification of either the standard form of engine or fuselage, which will provide easy access to the engine and associated parts while in position, which will provide for a down-draft on the engine when in position, which will provide a form of engine mounting which will permit the lowering of the engine as a whole from its mounting on the disconnection of a few extraneous parts and which will provide an internal strut for bracing the presently known structural parts of the fuselage without adding materially to the weight thereof.

Another object of the invention is to provide a simplified and easily installed form of engine mounting which will utilize certain rugged structural parts already present in the upper portion of helicopter fuselages of known design and to support the engine from such structural parts by the use of a light weight skeleton form of connecting unit, and in this way minimize the introduction of additional structural weight for engine mounting purposes.

Various other objects and advantages of the invention will be in part obvious from an inspection of the accompanying drawings and in part will be more fully set forth in the following particular description of one form of helicopter fuselage construction embodying the invention, and the invention also consists in certain new and novel features of construction and combination of parts hereinafter set forth and claimed.

In the accompanying drawings:

Figure 1 is a vertical transverse sectional view of certain of the parts of the fuselage and illustrating a preferred embodiment of the invention, with the engine and its mounting shown in side elevation; and Figures 2, 3 and 4 collectively illustrate an exploded view of certain of the parts of Figure 1 when certain fastening means are removed;

2

Figure 2 showing in plan a portion of the fuselage frame with parts broken away.

Figure 3 is a perspective view of the engine mounting.

Figure 4 is a perspective view of the engine nose, and

Figure 5 is a detail sectional view showing the strap connection between the mounting ring and one of the engine lugs.

In the drawing there is shown a fuselage 10 represented by its outer covering, usually called skin, 11, and by certain of its fuselage structural parts including the longitudinally extending parallel main spars 12 and 13, certain of its transverse spars 14, 15 and 16 coacting to form an interconnected system of spars. The fuselage is provided with a down-draft opening 17 at the top, which opening is outlined by a tubular shroud 18 depending into the interior of the fuselage. In the lower portion of the shroud is located a fan 19 and otherwise it is to be understood that the fuselage illustrated is intended to be representative of any conventional similar structures in which the engine mounting hereinafter featured may be installed.

Still following conventional disclosures, there is indicated an engine 20 of the usual upstanding type at present utilized in helicopters and other aircraft. The engine includes its main body portion 21 of relatively large over-all dimensions and an upstanding dome-shaped nose section 22 of relatively small over-all dimensions. The engine as a whole may be considered as being balanced about its center of gravity located approximately in the line c. g. The engine is provided with an upstanding fan shaft 23 connected to the fan hug 24 for driving the fan 19. There is also disclosed a pair of rotor drive shafts 25 and 26 in transverse axial alignment, mounted respectively in bearings 27 and 28 carried by the main spars 12 and 13. The rotor shafts are connected by links 29 and 30 to the driving shafts 31 and 32 of the engine as is well known in devices of this character.

The present disclosure particularly relates to an engine mount 33, shown separately in Figures 3, for suspending the engine by its nose section 22 from and between the main spars 12 and 13. The mount 33 is of an open work skeleton form and comprises a hollow four-sided frame 34 rectangular in plan, centered in which is the nose section 22. The mount also includes a circular mounting ring 35 which encircles the nose section adjacent its lower and substantially cylindrical portion 36.

The mounting ring is thus disposed in a horizontal plane spaced below the plane containing the hollow frame. The frame is provided at each of its four corners with an upstanding post 37 constituting part of the means by which the mount is attached to the main spars. The frame and mounting ring are rigidly connected by inclined braces 38 which extend outwardly and upwardly from the mounting ring to the four posts 37. The braces at each of the four sides of the mount are secured at their lower ends to each other and to the mounting ring to form V-shaped supports with their ends welded together along the joints 39. Gussets 40 are disposed between the sides of the frame and the upper ends of the braces. The mount is hung from the main struts 12 and 13 by means of long bolts 41 passed centrally through the struts and the tubular posts 37.

The nose section is provided with a circle of apertured lugs 42 cast thereon about its cylindrical portion 36. The mounting ring is provided with a plurality of straps 43 one for each lug and encircling the ring. The straps underlap the lugs and are demountably secured in position by bolts 44 as shown in Figure 5.

A ducting 45 of frusto-conical form provides an inward continuation of the shroud 18 and is disposed with its lower open end telescoping the upper portion of the engine body 21. This open end is braced from the cowling by a spacer 46. An inner or diffusion cowling 47 of cone shape form encloses the engine nose and coacts with the shroud and ducting to form an annular air conduit 48 for conducting air downwardly from the opening 17, past the blades of the fan and for discharging the down-draft produced by the fan on to or through the main or body portion of the engine. The cowling 47 is made of two parts, a closed nose 49 secured to and turning with the fan and an annular body portion 50 encircling the nose section of the engine and supported at its lower edge on the body portion of the engine.

The lower portion of the skin 11 in the part thereof which is below the ring 46 and which encircles the body 21 of the engine is made up of two hinged sections of cowling 51 and 52 hinged respectively at 53 and 54, each adapted to swing outwardly as indicated on the elevated sectional showing of the right section 52 in Figure 1. When in their normal lowered and closed position as indicated in the case of the left lowered section 51, their lower meeting edges are locked to a beam 55 forming a readily removable structural part of the fuselage.

In operation it will be understood that the engine functions conventionally in driving the rotor shafts and fan and it will be noted that the presence of the engine mounting herein featured in now way interferes with the usual functioning of these parts.

It is a feature of this disclosure that the engine is suspended from its nose and in this way there is omitted the usual engine mountings which extend into and thus take up space in the otherwise free lower portion of the engine cowling. This has the effect of reducing the space occupied by the cowling, particularly in the regions beneath the main spars whose location and presence are controlled by fuselage design.

The present disclosure features conveniences in removing the heavy engine whenever this becomes necessary. Simply by removing the bolts 44, the links 29 and 30 and the minor connections not shown, the engine can be lowered out of the ring without difficulty. By providing the suggested or any other suitable opening in the lower portion of the cowling, it is possible to remove the engine as a whole from the machine without the necessity of further disassembling any part of the fuselage or of the engine construction. It is particularly noted that except for the light mount, no additional parts are needed and that the engine is supported directly from the heavy structural parts, such as the main spars already present in the fuselage construction, which spars are normally near the top of the helicopter fuselage, to receive the lift forces from the rotors.

I claim:

1. In a helicopter, the combination of a fuselage provided with a pair of main spars constituting a structural part of the fuselage, an engine for driving the helicopter disposed with its nose section uppermost and located between the main spars, a pair of rotor drive shafts and journals therefor, one supported from each of the main spars, links connecting the inner ends of the drive shafts with the engine shaft, an open work skeleton mount for supporting the engine in position between and suspended on the main spars, said frame including a horizontally disposed mounting ring encircling and demountably secured to the nose section of the engine, a horizontally extending four-sided frame rectangular in plan in which the nose section is substantially centered, a post at each corner of the frame rigidly connected adjacent ends of the sides of the frame, bolts passing through the posts for supporting the posts from the main spars, and said frame also including diagonal braces connecting the mounting ring and frame and coacting therewith to provide a rugged internally braced mount capable of supporting the helicopter driving engine from the structural parts already in the fuselage, substantially without vibration.

2. In a helicopter fuselage in which the usual fixed structural elements thereof are contained in its upper portion and with its lower portion free of such fixed structural parts, the combination of an engine having an upper nose portion extending from said upper portion between certain of said structural elements into the lower portion and having its lower portion of greater horizontal dimension than the nose portion, means engaging the lower part of the nose portion for suspending the engine from said fixed structural elements, and detachable means for securing the engine to said suspending means, the engine and said suspending means being dimensioned to permit the engine to be dropped from said suspending means through said free lower portion on the release of said detachable securing means.

3. The combination of an upstanding engine with a circle of mounting lugs on its nose section and means for mounting the engine including a mounting ring encircling the line of lugs, straps on the ring underlapping the lugs, bolts for securing the straps to the lugs, said ring being dimensioned to permit the nose section to pass out of the ring when the engine is rotated about a vertical axis to cause the lugs to clear the straps and lowered following a release of the bolts.

4. An engine mounting for suspending an engine in an upright position, said mounting including a mounting ring providing a cradle encircling the engine and detachable means above its center of gravity for securing the engine to the ring, said ring and the portion of the engine above said detachable means dimensioned to permit the engine to be dropped down out of the ring when the engine is rotated to cause the elements of the detachable means to clear each other.

5. In an airship, the combination of means forming a fuselage including two widely spaced apart rugged supports, an engine having its upper portion hung between the supports and its lower portion depending below the plane containing the supports, and means for suspending the engine from the supports, said means including an open tubular mount having an inner lower portion of relatively small horizontal cross sectional area secured directly to the upper portion of the engine and having an upper portion of greater horizontal cross sectional area than the lower portion and secured at opposite sides thereof directly to the spaced supports, and said means also including braces connecting the upper and lower portions whereby the weight of the engine is transferred outwardly and upwardly through the suspending means directly to the rugged supports forming part of the fuselage.

6. In a helicopter having a fuselage with spaced structural members in the upper portion thereof, an upright tubular structure opening through the top of the fuselage and extending downwardly between said spaced structural members to provide an air passage, an engine having its major portion disposed in the fuselage beneath said structural members and substantially aligned with said tubular structure to be cooled by air flowing through said passage, said engine having an upper portion of smaller horizontal cross-section than the major portion thereof and a fan shaft extending upwardly from said engine upper portion in substantially centered relation within said tubular structure, a fan mounted on said shaft within said passage for propelling air through the latter, a substantially horizontal mounting ring encircling said engine upper portion and detachably secured thereto to provide for removal of the engine by being lowered from said mounting ring and tubular structure, and brace members extending upwardly and outwardly through said passage from said mounting ring for connection with said structural members for transferring to the latter loads imposed on the mounting ring by the engine.

7. In a helicopter having a fuselage with spaced structural members in the upper portion thereof, an upright tubular structure opening through the top of the fuselage and extending downwardly between said spaced structural members to provide an air passage, an engine having its major portion disposed in the fuselage beneath said structural members and substantially aligned with said tubular structure to be cooled by air flowing through said passage, said engine having a reduced upper portion of smaller cross-section than the major portion thereof and a fan shaft extending upwardly from said engine upper portion in substantially centered relation within said passage, a fan mounted on said shaft within said passage for propelling air through the latter, and an engine mount comprising a substantially horizontal mounting ring encircling and detachably secured to said engine to provide for removal of the engine by being lowered from said mounting ring and tubular structure, said mount further comprising a frame extending around said tubular structure and secured to said spaced structural members, and said mount still further comprising brace members extending upwardly and outwardly through said passage from said mounting ring to said frame for transferring engine loads to the structural members.

8. In a helicopter having a fuselage with spaced structural members in the upper portion thereof, an upright tubular structure opening through the top of the fuselage and extending downwardly between said spaced structural members to provide an air passage, an engine having its major portion disposed in the fuselage beneath said structural members and substantially aligned with said tubular structure to be cooled by air flowing through said passage, said engine having an upper portion of smaller horizontal cross-section than the major portion thereof, said engine upper portion being disposed substantially centrally within said tubular structure, an engine mount for suspending the engine from said spaced structural members comprising a substantially horizontal ring and brace members extending therefrom upwardly and outwardly through said passage for connection with said structural members, said ring encircling said engine upper portion and detachably secured thereto to provide for the engine being lowered from the ring and tubular structure, and the lower portion of said fuselage housing said engine and comprising a separable panel to provide for removal of the engine from the fuselage upon detachment from said ring.

9. In a helicopter having a fuselage with spaced structural members in the upper portion thereof, an upright tubular structure opening through the top of the fuselage and extending downwardly between said spaced structural members to provide an air passage, an engine having its major portion disposed in the fuselage beneath said structural members and substantially aligned with said tubular structure to be cooled by air flowing through said passage, said engine having an upper portion of smaller horizontal cross-section than the major portion thereof, said engine upper portion being disposed substantially centrally within said tubular structure, an engine mount for suspending the engine from said spaced structural members comprising a substantially horizontal ring and brace members extending therefrom upwardly and outwardly through said passage to points adjacent said structural members, and said ring encircling said engine upper portion and detachably secured thereto to provide for the engine being lowered from the ring and tubular structure.

10. In a helicopter having a fuselage with spaced structural members in the upper portion thereof, an upright tubular structure opening through the top of the fuselage and extending downwardly between said spaced structural members to provide an air passage, an engine having its major portion disposed in the fuselage beneath said structural members and substantially aligned with said tubular structure to be cooled by air flowing through said passage, said engine having an upper portion of smaller horizontal cross-section than the major portion thereof, and engine mounting means for suspending the engine in detachable relation to the aforementioned structure comprising a plurality of braces extending downwardly and inwardly from said spaced structural members through said air passage, and further comprising a ring connected to the lower and inner ends of the braces, said ring encircling said upper portion of the engine and detachably secured to the engine whereby the latter may be lowered from the ring for detachment from the helicopter.

11. In a helicopter having an engine with a fan shaft extending vertically from a reduced upper end portion of the engine, and having supporting structure spaced laterally from said upper portion of the engine, the combination therewith of a mount for suspending the engine, said mounting including a horizontal polygonal frame extending in substantially spaced relation about said upper portion of the engine, upstanding posts at the corners of the frame for attaching the latter to said supporting structure, a mounting ring disposed in a horizontal plane below the frame and forming a cradle through which said upper portion of the engine extends and to which it is demountably attached with the major portion of the engine underlying the ring, whereby the engine may be lowered from the mount in being detached therefrom, and inclined braces extending outwardly and upwardly from the ring to the posts to provide rigidity in the mount, said braces acting to transfer to the supporting structure through said posts the loads imposed on the mounting ring by the engine.

12. In a helicopter, the combination of an engine having its fan shaft extending vertically out of its nose, an open work mount for supporting the engine in suspended position, said mount including a hollow frame in which the engine nose is substantially centered, structural means for supporting the frame at opposite sides thereof, said mount including a mounting ring located in a plane below the plane of the frame and above the center of gravity of the engine and forming a cradle in which the engine nose is demountably suspended leaving the main body of the engine extending below the level of the mounting ring and said mount also including inclined braces extending outwardly and upwardly from the ring to the frame to give rigidity to the mount and permanently secured to both the frame and ring.

13. A mounting for suspending an engine with its main shaft axis in an upright position, said mounting including a horizontal mounting ring encircling a reduced upper portion of the engine above the center of gravity of the latter, a substantially rectangular horizontal frame encompassing a larger area than the ring disposed in spaced relation above the ring, means at the corners of said frame for attaching it to support means, and inclined braces extending outwardly and upwardly from the ring to the corners of the frame, said braces acting to provide rigidity to the mounting and to transfer to the support means loads imposed by the engine on the ring.

14. In a helicopter having an engine with its main shaft axis in an upright position and having an upper end portion of smaller cross-sectional area than the major portion of the engine lying beneath said end portion, and said helicopter having supporting structure spaced laterally from said engine end portion, the combination therewith of a mounting comprising a horizontal mounting ring encircling a lower part of said engine end portion above the center of gravity of the engine and detachably secured thereto in such manner that the engine may be lowered from the ring for detachment from the helicopter, a polygonal horizontal frame disposed above said ring and in spaced relation around said engine end portion, means at the corners of said frame for attaching it to said supporting structure, and brace members extending upwardly and outwardly from said ring to the corners of said frame to provide rigidity to the mounting and to transmit engine loads to the supporting structure.

ROBERT W. JENNY.

REFERENCES CITED

The following references are of record in the file of this patent:

UNITED STATES PATENTS

| Number | Name | Date |
| --- | --- | --- |
| 1,491,310 | Perrin | Apr. 22, 1924 |
| 1,842,250 | Bobrovsky et al. | Jan. 19, 1932 |
| 1,890,931 | Briner | Dec. 13, 1932 |
| 1,892,065 | Markey | Dec. 27, 1932 |
| 2,056,938 | Johnson | Oct. 13, 1936 |
| 2,178,998 | Scott | Nov. 7, 1939 |
| 2,188,807 | Castricone | Jan. 30, 1940 |
| 2,337,571 | Pullin | Dec. 28, 1943 |
| 2,368,334 | Tyler | Jan. 30, 1945 |